(12) United States Patent
Shimazu

(10) Patent No.: US 10,625,425 B2
(45) Date of Patent: Apr. 21, 2020

(54) POSITION AND POSTURE ADJUSTMENT METHOD

(71) Applicant: HONDA MOTOR CO., LTD., Minato-Ku, Tokyo (JP)

(72) Inventor: Fumihiko Shimazu, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 15/915,404

(22) Filed: Mar. 8, 2018

(65) Prior Publication Data

US 2018/0257234 A1     Sep. 13, 2018

(30) Foreign Application Priority Data

Mar. 8, 2017    (JP) .................................. 2017-043767

(51) Int. Cl.
*B25J 15/04*     (2006.01)
*B25J 9/16*      (2006.01)
*B25J 11/00*     (2006.01)

(52) U.S. Cl.
CPC ........... *B25J 9/1692* (2013.01); *B25J 9/1697* (2013.01); *B25J 11/005* (2013.01);
(Continued)

(58) Field of Classification Search
CPC ...... B25J 9/1692; B25J 9/1697; B25J 11/005; B25J 13/085; B25J 13/089; B25J 15/04;
(Continued)

(56) References Cited

U.S. PATENT DOCUMENTS

| | | | | |
|---|---|---|---|---|
| 2009/0126542 A1* | 5/2009 | Nonaka | .................... | B25J 15/04 83/43 |
| 2014/0015957 A1* | 1/2014 | Fujikawa | ................. | H04N 7/18 348/95 |
| 2014/0114459 A1* | 4/2014 | Nakahara | ............. | G05B 19/042 700/112 |
| 2014/0161344 A1* | 6/2014 | Rodriges | ............... | G06T 1/0014 382/152 |

(Continued)

FOREIGN PATENT DOCUMENTS

| | | |
|---|---|---|
| JP | 2010-524704 A | 7/2010 |
| WO | 2008/131949 A2 | 11/2008 |

OTHER PUBLICATIONS

Ng et al., Intuitive robot tool path teaching using laser and camera in Augmented Reality environment, 2010, IEEE, p. 114-119 (Year: 2010).*

(Continued)

*Primary Examiner* — McDieunel Marc
(74) *Attorney, Agent, or Firm* — Carrier Blackman & Associates, P.C.; Joseph P. Carrier; William D. Blackman

(57) ABSTRACT

An objective is to provide a position and posture adjustment method capable of promptly adjusting the position and the posture of a robot with respect to a workpiece while making variations caused by the operator small. The position and posture adjustment method includes provisional teaching step S1, marker installation step S2 of installing a marker having a head cut conical shape in the workpiece, an initial movement step S3 of moving an arm distal end portion such that the irradiated positions of three laser displacement gauges are arranged within the end surface of the marker, posture modification step S4 of moving the arm distal end portion such that the measured values of the three laser displacement gauges become close to one another, approach step S5 of bringing the arm distal end portion close to the marker along the Z axis, alignment step S6 of causing an axis of the arm distal end portion and a marker axis to coincide with each other by moving the arm distal end portion parallel along a plane perpendicular to the Z axis such that the measured values of the three laser displacement gauges become close to one another, and positioning step S7 of adjusting the position of the arm distal end portion by moving the arm distal end portion along the Z axis.

2 Claims, 14 Drawing Sheets

(52) U.S. Cl.
CPC ... *G05B 2219/39033* (2013.01); *Y10S 901/09* (2013.01); *Y10S 901/47* (2013.01)

(58) Field of Classification Search
CPC ... B25J 16/1656; B25J 9/1682; Y10S 901/09; Y01S 901/47; G05B 2219/39033; G05B 19/042; G06N 20/00; G06T 1/0014; G06T 7/74; H04N 7/18; B26D 1/1535
See application file for complete search history.

(56) References Cited

U.S. PATENT DOCUMENTS

| | | | | |
|---|---|---|---|---|
| 2014/0332504 | A1* | 11/2014 | Hamada | B23K 31/00 219/121.4 |
| 2015/0148952 | A1* | 5/2015 | Shiratsuchi | B25J 9/1682 700/248 |
| 2017/0057093 | A1* | 3/2017 | Miyamoto | B25J 13/085 |
| 2018/0161984 | A1* | 6/2018 | Ishige | B25J 9/1692 |

OTHER PUBLICATIONS

Wagner et al., Self-calibration method for a robotic based 3D scanning system, 2015, IEEE, p. 1-6 (Year: 2015).*

Xing et al., On the study of workpiece localization with a cost-effective vision based method, 2015, IEEE, p. 457-461 (Year: 2015).*

Wagner et al., 3D Scanning of Workpieces with Cooperative Industrial Robot Arms, 2016, IEEE, p. 431-438 (Year: 2016).*

* cited by examiner

POSITION AND POSTURE ADJUSTMENT METHOD

This application is based on and claims the benefit of priority from Japanese Patent Application No. 2017-043767, filed on Mar. 8, 2017, the content of which is incorporated herein by reference.

BACKGROUND OF THE INVENTION

Field of the Invention

The present invention relates to a position and posture adjustment method. More specifically, the present invention relates to a position and posture adjustment method for adjusting a position and a posture of a robot with respect to a workpiece, using a measuring device provided at an arm distal end portion of the robot and a marker arranged in the workpiece.

Related Art

Various tools such as a welding gun, an electric driver, and a probe are attached to an arm distal end portion of a robot. In the case of performing appropriate work on a workpiece using these tools, a position and a posture of a work region of the workpiece where the work is to be performed using the tools (that is, an orientation of the work region of the workpiece) need to be specified in a coordinate system of the robot, and an operation to move the arm distal end portion to an appropriate position and posture according to the specified position and posture of the work region needs to be taught to the robot. Further, the work of teaching the robot is often performed by simulation using a computer. However, because the simulation has errors, the robot has individual differences, and the workpiece has manufacturing variation, an operator needs to finely adjust the teaching operation set in the simulation according to the actual robot, workpiece, and the like.

JP 2010-524704 T discloses a positioning device that positions an arm distal end portion of a robot with respect to a workpiece. This positioning device includes a pair of light sources that emits a pair of light beams intersecting at one point. An operator attaches the positioning device to the arm distal end portion of the robot, and visually confirms an irradiation situation of the pair of light beams on the work to finely adjust the positional relationship between the arm distal end portion to which the positioning device is attached and the workpiece.

SUMMARY OF THE INVENTION

According to the positioning device of JP 2010-524704 T, the operator needs to derive the positional relationship between the arm distal end portion and the workpiece from an irradiation pattern of the light beams on the workpiece, and thus time is required for the work and variation may occur depending on the operator.

An objective of the present invention is to provide a position and posture adjustment method capable of promptly adjusting a position and a posture of a robot with respect to a workpiece while making variation due to an operator small.

(1) A position and posture adjustment method is a method for adjusting a position and a posture of an arm distal end portion (for example, an arm distal end portion 13 described below) with respect to a workpiece (for example, a workpiece W described below), using a measuring device (for example, a distance measuring instrument 2 described below) attached to the arm distal end portion of a robot (for example, a work robot 1 described below) and a marker (for example, a marker 5 described below) having a head cut conical shape arranged in the workpiece, and the measuring device including three laser displacement gauges (for example, a first laser displacement gauge 21, a second laser displacement gauge 22, and a third laser displacement gauge 23 described below) respectively arranged at vertexes of an equilateral triangle and respectively having optical axes set to intersect at a vertex of a trigonal pyramid having the equilateral triangle as a base. The position and posture adjustment method includes a provisional teaching step of teaching the robot a predetermined position and a predetermined posture of the workpiece (for example, step S1 in FIG. 4 described below), a marker installation step of installing the marker at the predetermined position of the workpiece with the predetermined posture (for example, step S2 in FIG. 4 described below), an initial movement step of moving the arm distal end portion such that irradiated positions of the three laser displacement gauges are arranged within an end surface (for example, an end surface 52 described below) of the marker, using a result of the provisional teaching step (for example, step S3 in FIG. 4 described below), a posture modification step of moving the arm distal end portion such that measured values of the three laser displacement gauges become close to each other while maintaining a state in which the irradiated positions of the three laser displacement gauges are arranged within the end surface (for example, step S4 in FIG. 4 described below), an approach step of bringing the arm distal end portion close to the marker along an axis of the trigonal pyramid such that a diameter of a virtual circle passing through the irradiated positions of the three laser displacement gauges in a virtual plane including the end surface becomes larger than a diameter of the end surface (for example, step S5 in FIG. 4 described below), an alignment step of causing the axis of the trigonal pyramid and an axis of the marker to coincide with each other by moving the arm distal end portion parallel along a plane perpendicular to the axis of the trigonal pyramid such that the measured values of the three laser displacement gauges become close to each other (for example, step S6 in FIG. 4 described below), and a positioning step of adjusting the position of the arm distal end portion by moving the arm distal end portion along the axis of the trigonal pyramid (for example, step S7 in FIG. 4 described below).

(2) In this case, the initial movement step favorably includes a provisional teaching operation execution step of setting the arm distal end portion to a predetermined position and posture, using the result of the provisional teaching step (for example, step S31 in FIG. 6 described below), an end surface search step of moving the arm distal end portion such that all the measured values of the three laser displacement gauges become values close to one another (for example, step S32 in FIG. 6 described below), a separation step of separating the arm distal end portion from the marker along the axis of the trigonal pyramid such that the irradiated positions of the three laser displacement gauges are arranged within the end surface (for example, step S33 in FIG. 6 described below).

(1) The position and posture adjustment method of the present invention includes a provisional teaching step, a marker installation step, an initial movement step, a posture modification step, an approach step, an alignment step, and a positioning step. In the initial movement step, the arm distal end portion is moved such that the irradiated positions of the three laser displacement gauges are arranged within the end surface of the marker, by using a result of the provisional teaching step. Next, in the posture modification step, the arm distal end portion is moved such that the measured values of the three laser displacement gauges become close while maintaining the state in which the three irradiated positions are arranged within the end surface of the marker. With this step, an axis of the marker having the head cut conical shape and an axis of the trigonal pyramid become parallel. Next, in the approach step, the arm distal end portion is brought close to the marker along the axis of the trigonal pyramid until the diameter of the virtual circle passing through the irradiated positions of the laser displacement gauges becomes larger than the diameter of the end surface. With this step, the arm distal end portion can be brought close to the marker while maintaining the state where the axis of the trigonal pyramid is parallel to the axis of the marker. Next, in the alignment step, the axis of the trigonal pyramid and the axis of the marker are caused to coincide with each other by moving the arm distal end portion parallel such that the measured values of the three laser displacement gauges become close. As described above, in the approach step, the arm distal end portion is brought close until the diameter of the circle formed of the irradiated positions of the three laser displacement gauges become larger than the diameter of the end surface, and thus when the measured values of the three laser displacement gauges are close, the irradiated positions of the laser displacement gauges are positioned on a tapered surface around the end surface of the marker, and both the axes coincide with each other. Next, in the positioning step, the position of the arm distal end portion is adjusted by moving the arm distal end portion along the axis of the trigonal pyramid. As described above, according to the position and posture adjustment method of the present invention, the arm distal end portion can be adjusted to the position separated from the marker having a known shape by a known distance and the posture coaxial with the axis of the marker, whereby the position and posture of the arm distal end portion with respect to the workpiece can be adjusted.

Note that, in the present invention, the irradiated positions of the laser displacement gauges can be calculated by a simple arithmetic operation using the measurement values of the laser displacement gauges by using the three laser displacement gauges that can measure the distances from the light sources to the irradiated positions as a measuring device, and further using the marker having the head cut conical shape as the marker. Therefore, in executing the initial movement step, the posture modification step, the approach step, the alignment step, and the positioning step, an operator does not need to visually confirm the irradiated positions of laser light. Therefore, in the present invention, nearly all the steps can be automated. According to the present invention, the position and posture of the arm distal end portion with respect to the workpiece can be promptly adjusted while making variation due to the operator small.

(2) As described above, in the initial movement step, the arm distal end portion is moved such that all the irradiated positions of the three laser displacement gauges are arranged within the end surface of the marker. At this time, in the case where the position and posture of the workpiece taught in the provisional teaching step are appropriate, all the irradiated positions of the three laser displacement gauges are arranged within the end surface when the arm distal end portion is moved using the result of the provisional teaching step. However, in the case where the position and posture of the workpiece taught in the provisional teaching step are inappropriate, the arm distal end portion needs to be further moved after being moved using the result of the provisional teaching step. In consideration of such a case, in the initial movement step of the present invention, an end surface search step and a separation step are performed after the provisional teaching operation execution step. In the end surface search step, the arm distal end portion is moved such that all the measured values of the three laser displacement gauges become values close to each other. With the step, the arm distal end portion can be moved to a vicinity of the end surface of the marker. Next, in the separation step, the arm distal end portion is separated from the marker along the axis of the trigonal pyramid such that all the irradiated positions of the three laser displacement gauges are arranged within the end surface. When the arm distal end portion is separated from the marker along the axis of the trigonal pyramid in this manner, a triangle formed of the three irradiated positions becomes small. Therefore, all the three irradiated positions can be arranged within the end surface under a simple control rule.

DETAILED DESCRIPTION OF THE INVENTION

Hereinafter, an embodiment of the present invention will be described in detail with reference to the drawings.

Figure 1:
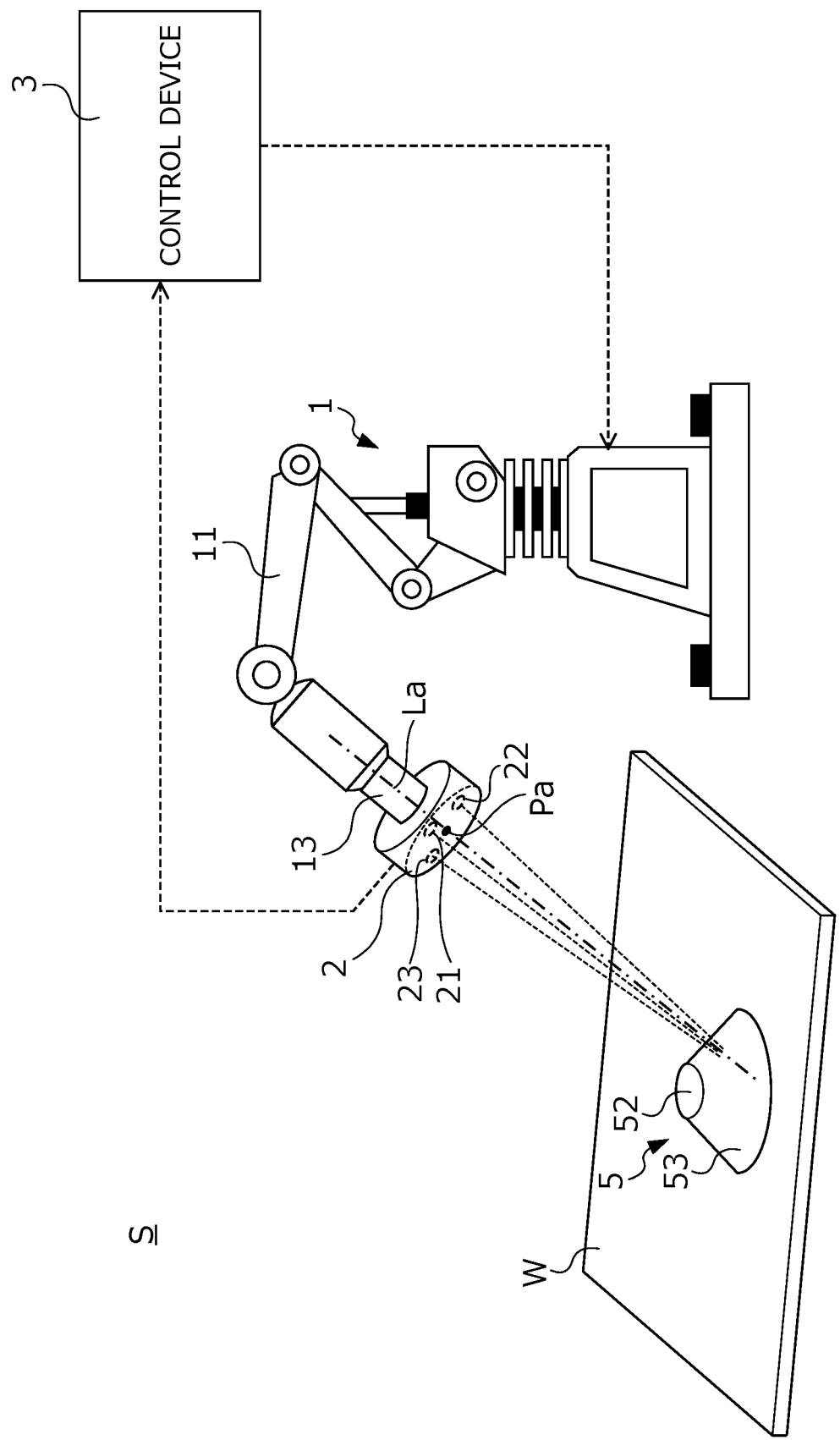
FIG. 1 is a diagram illustrating a configuration of a robot system to which a position and posture adjustment method according to an embodiment of the present invention is applied.

FIG. 1 is a diagram illustrating a configuration of a robot system S to which a position and posture adjustment method according to the present embodiment is applied. The robot system S includes a work robot 1 that performs various types of work, a distance measuring instrument 2 attached to an arm distal end portion 13 of the work robot 1, a control device 3 that controls the work robot 1 and the distance measuring instrument 2, a workpiece W that is an object to be worked on by the work robot 1, and a marker 5 installed on the workpiece W.

The work robot 1 includes an articulated arm 11 configured from coupling of a plurality of arm portions, and the arm distal end portion 13 pivotally supported by a distal end portion of the articulated arm 11. The work robot 1 drives the articulated arm 11 on the basis of a control signal transmitted from the control device 3, thereby to change the position and posture of the arm distal end portion 13 in a three-dimensional space.

Various tools such as a welding gun, a nut runner, and a holding tool can be attached to the arm distal end portion 13 of the work robot 1, other than the distance measuring instrument 2. That is, in the robot system S, by detaching the distance measuring instrument 2 from the arm distal end portion 13 and attaching a tool according to the specific work content instead, the work using the tool can be performed.

The distance measuring instrument 2 includes a first laser displacement gauge 21, a second laser displacement gauge 22, and a third laser displacement gauge 23. Each of the laser displacement gauges 21 to 23 includes a light source that irradiates an object with laser light along an optical axis and a light-receiving element that receives laser light reflected from the object. Each of the laser displacement gauges 21 to 23 measures the distance along the optical axis of the laser light from the light source to an irradiated position of the laser light in the object, using the light source and the light-receiving element, and transmits the signal according to a measured value to the control device 3. Note that, hereinafter, the measured values of the laser displacement gauges 21, 22, and 23 are respectively written as ZL1, ZL2, and ZL3.

Figure 2:
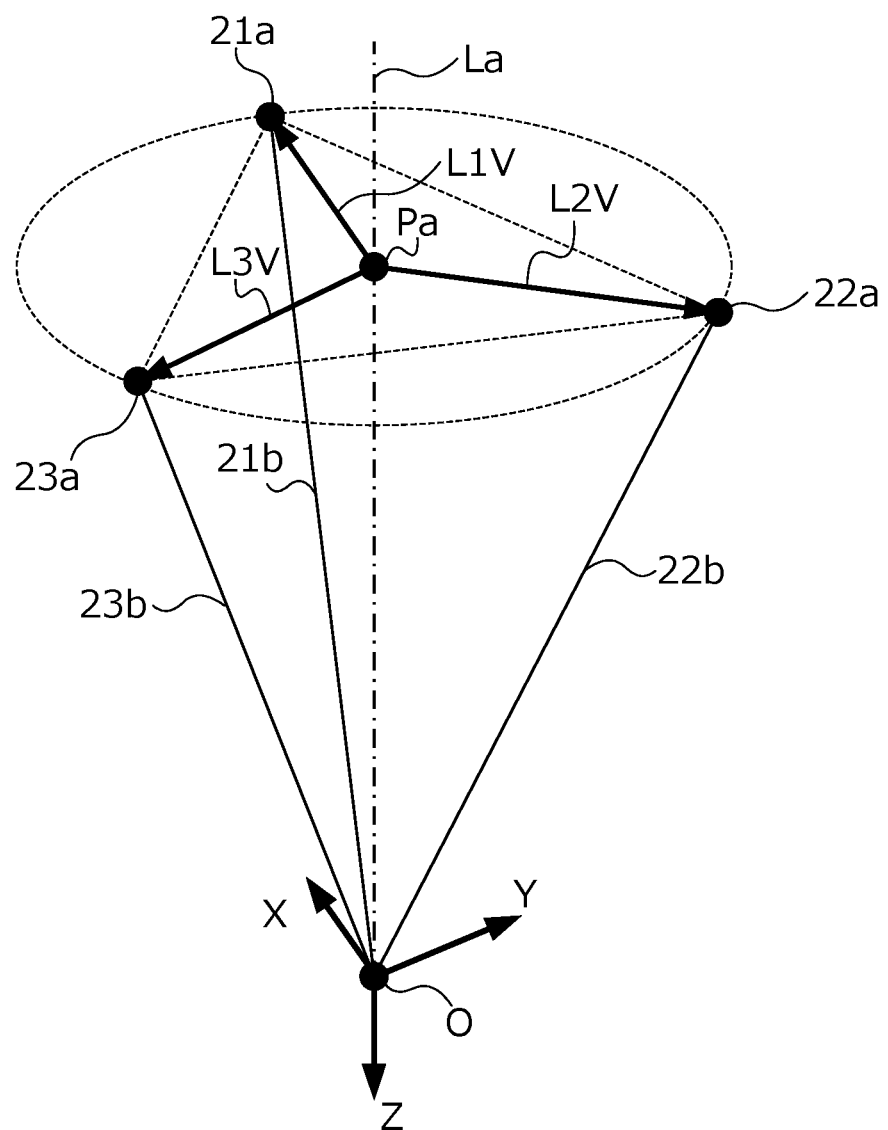
FIG. 2 is a view schematically illustrating a positional relationship between light sources and optical axes of three laser displacement gauges.

FIG. 2 is a view schematically illustrating a positional relationship among light sources 21a, 22a, and 23a and optical axes 21b, 22b, and 23b of the three laser displacement gauges. As illustrated in FIG. 2, the light sources 21a to 23a of the three laser displacement gauges 21 to 23 are respectively arranged at vertexes of an equilateral triangle. Further, the light receiving elements of the laser displacement gauges 21 to 23 are arranged near the respective light sources 21a to 23a. The three optical axes 21b to 23b extending from the light sources 21a to 23a are set to intersect at a vertex O of a trigonal pyramid having, as a base, an equilateral triangle with the light sources 21a to 23a as vertexes.

Note that, hereinafter, a center point of the equilateral triangle with the light sources 21a to 23a as vertexes is defined as a center point Pa of the distance measuring instrument 2. Further, the axis of the trigonal pyramid having the equilateral triangle as a base and configured from the three optical axes 21b to 23b (that is, the line passing through the center point Pa and the vertex O) is defined as the axis La of the distance measuring instrument 2. Further, hereinafter, vectors extending from the center point Pa to the light sources 21a, 22a, and 23a are respectively defined as azimuth vectors L1V, L2V, and L3V of the laser displacement gauges. Further, hereinafter, a coordinate system having the axis La as the Z axis, a plane perpendicular to the Z axis as the X-Y plane, and the vertex O as the origin (0, 0, 0) is referred to as "tool coordinate system". Further, in this tool coordinate system, the X axis is parallel to the azimuth vector L1V.

A storage device of the control device 3 stores a teaching program that defines the teaching operation to be realized by the work robot 1. The control device 3 generates a control signal according to the teaching program, and inputs the control signal to the work robot 1 to cause the work robot 1 to perform the teaching operation according to the program.

By the way, this teaching program can be created using computer simulation. However, an operator needs to finely adjust the teaching operation set in the simulation according to the actual states of the work robot 1 and the workpiece W, due to errors of the simulation, individual differences in the robot, installation errors due to facility relocation, and the like. Hereinafter, the procedure of the position and posture adjustment method for adjusting the gap between the position and posture of the arm distal end portion 13 realized by the teaching program defined on the basis of the computer simulation, and the position and posture of the arm distal end portion 13 to be finally realized by the teaching operation.

Figure 3:
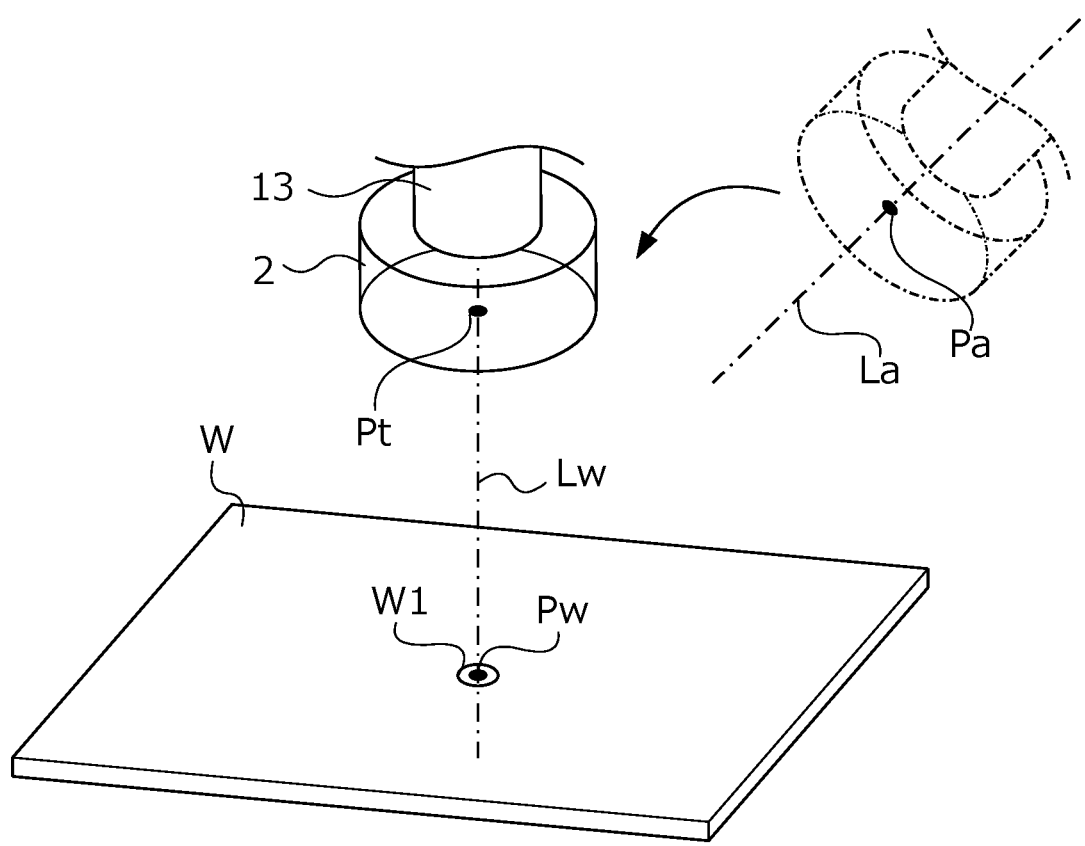
FIG. 3 is a view illustrating an example of a position and a posture of an arm distal end portion to be finally realized by the position and posture adjustment method.

FIG. 3 is a view illustrating an example of the position and posture of the arm distal end portion 13 to be finally realized by the position and posture adjustment method of the present embodiment. Note that, hereinafter, a case of using a planar workpiece with a hole portion W1 formed in a predetermined position, as the workpiece W, will be described. However, the present invention is not limited to the case. In the present embodiment, the hole portion W1 is used as a mark, a work region point Pw is defined in the center of the hole portion W1, and a target position Pt is further defined at a position separated by a predetermined work distance along a normal line Lw of the work W, the normal line Lw passing through the work region point Pw. Hereinafter, a teaching operation to move the arm distal end portion 13 to a position where the center point Pa of the distance measuring instrument 2 and the target position Pt coincide with each other, and to move the arm distal end portion 13 to have a posture at which the axis La of the distance measuring instrument 2 and the normal line Lw are on the same axis will be described as an example.

Figure 4:
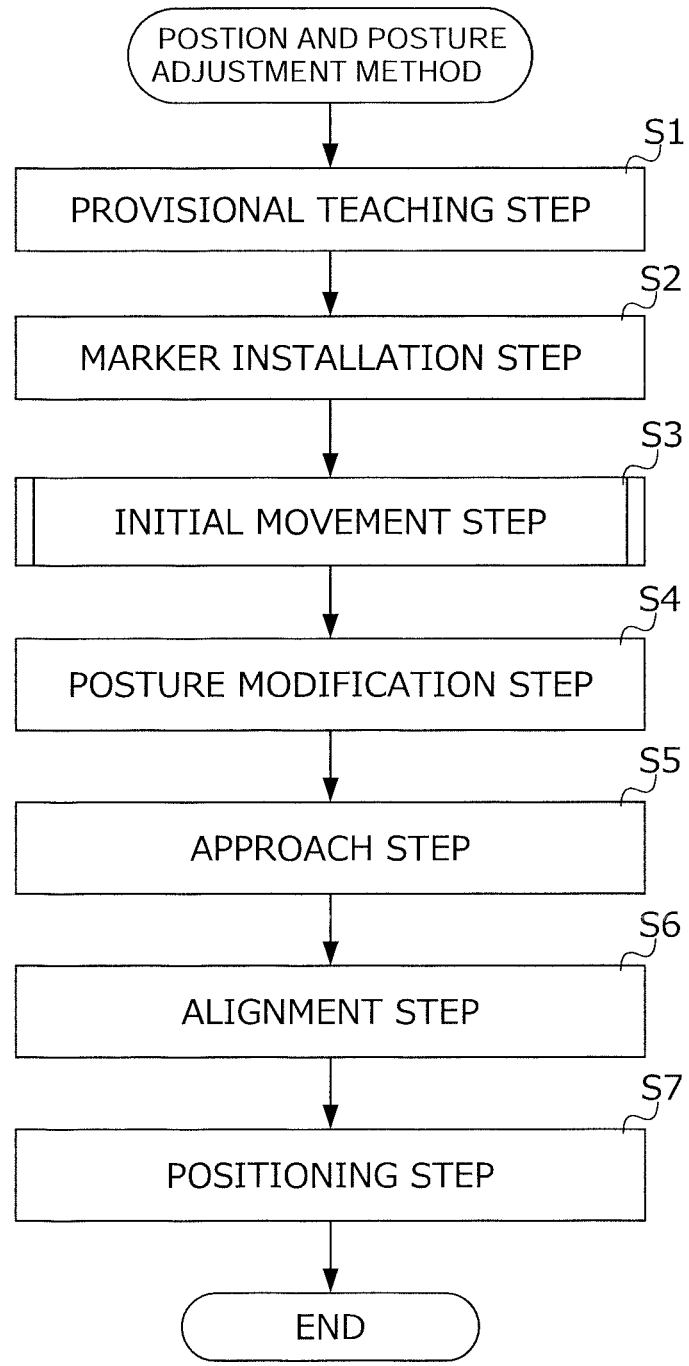
FIG. 4 is a flowchart illustrating a specific procedure of the position and posture adjustment method for the arm distal end portion.

FIG. 4 is a flowchart illustrating a specific procedure of the position and posture adjustment method.

First, in provisional teaching step S1, the operator calculates the position of the work region point Pw of the workpiece W and the posture of the work region point (that is, the direction of the normal line Lw) described with reference to FIG. 3 by simulation, and teaches the robot the position and posture. In the subsequent steps, the position and posture of the arm distal end portion 13 can be set to the position and posture close to the target described with reference to FIG. 3, by using the result of provisional teaching step S1.

Figure 5A:
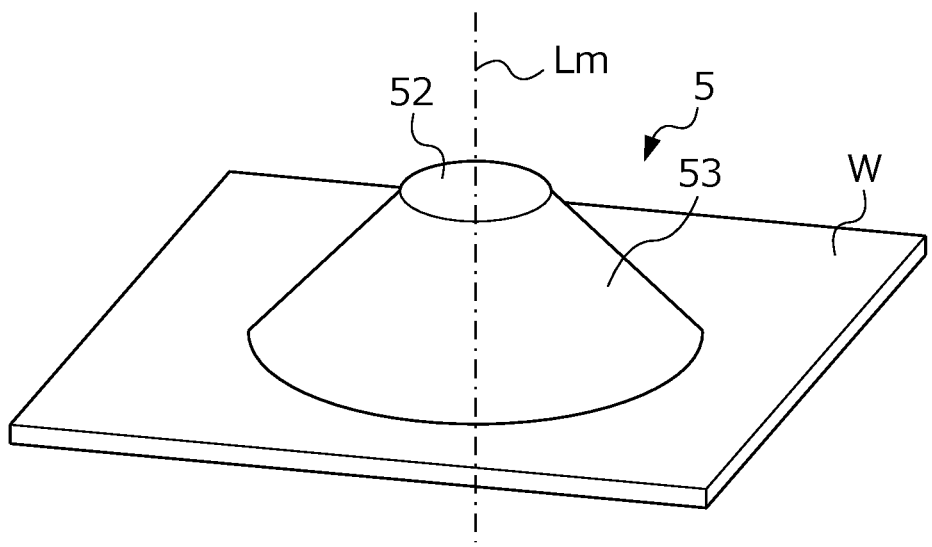
FIG. 5A is a perspective view of a marker installed on a workpiece.
Figure 5B:
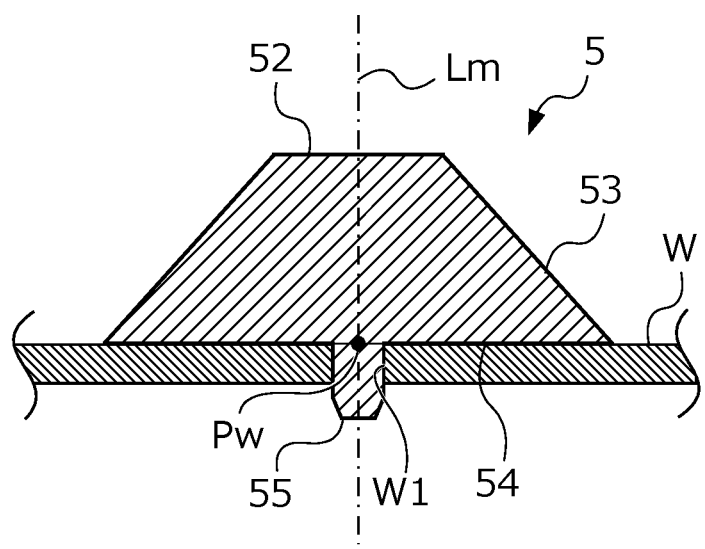
FIG. 5B is a sectional view along an axis of the marker.

Next, in marker installation step S2, as illustrated in FIG. 5A, the operator installs the marker 5 at a predetermined position of the workpiece W with a predetermined posture. The marker 5 has a head cut conical shape (in other words, a truncated cone shape) and includes an end surface 52 having a planar shape perpendicular to the marker axis Lm and having a perfect circle centered at the marker axis Lm in plan view and a slope surface 53 expanding from the end surface 52 toward the surface of the workpiece W in a tapered manner. Further, as illustrated in the sectional view of FIG. 5B, a pin 55 protruding from the bottom surface along the marker axis Lm is provided in the center of the bottom portion 54 of the marker 5. The pin 55 is inserted into the hole portion W1 of the workpiece W. By inserting and installing the pin 55 into the hole portion W1, the marker 5 can be installed at the work region point Pw determined in the hole portion W1 with the posture at which the marker axis Lm and the normal line Lw (see FIG. 3) of the workpiece W are on the same axis. Note that either provisional teaching step S1 or marker installation step S2 may be performed first or both the steps may be performed at the same time.

Next, in initial movement step S3, the control device 3 controls the work robot 1, using the result of the provisional teaching step, to move the arm distal end portion 13 to a predetermined position and posture.

Figure 6:
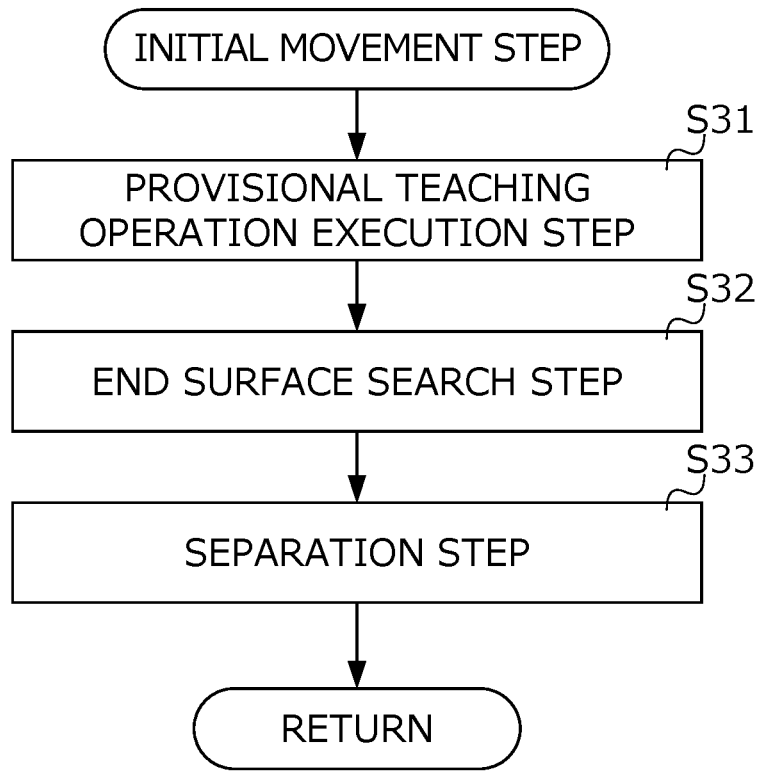
FIG. 6 is a flowchart illustrating a specific procedure of an initial movement step.

FIG. 6 is a flowchart illustrating a specific procedure of the initial movement step.

First, in provisional teaching operation execution step S31, the control device 3 assumes that the workpiece W exists at the position and posture taught in provisional teaching step S1, calculates the target position and the target position of the distance measuring instrument 2 described with reference to FIG. 3 on that assumption, and controls the work robot 1 to realize the targets.

Figure 7:
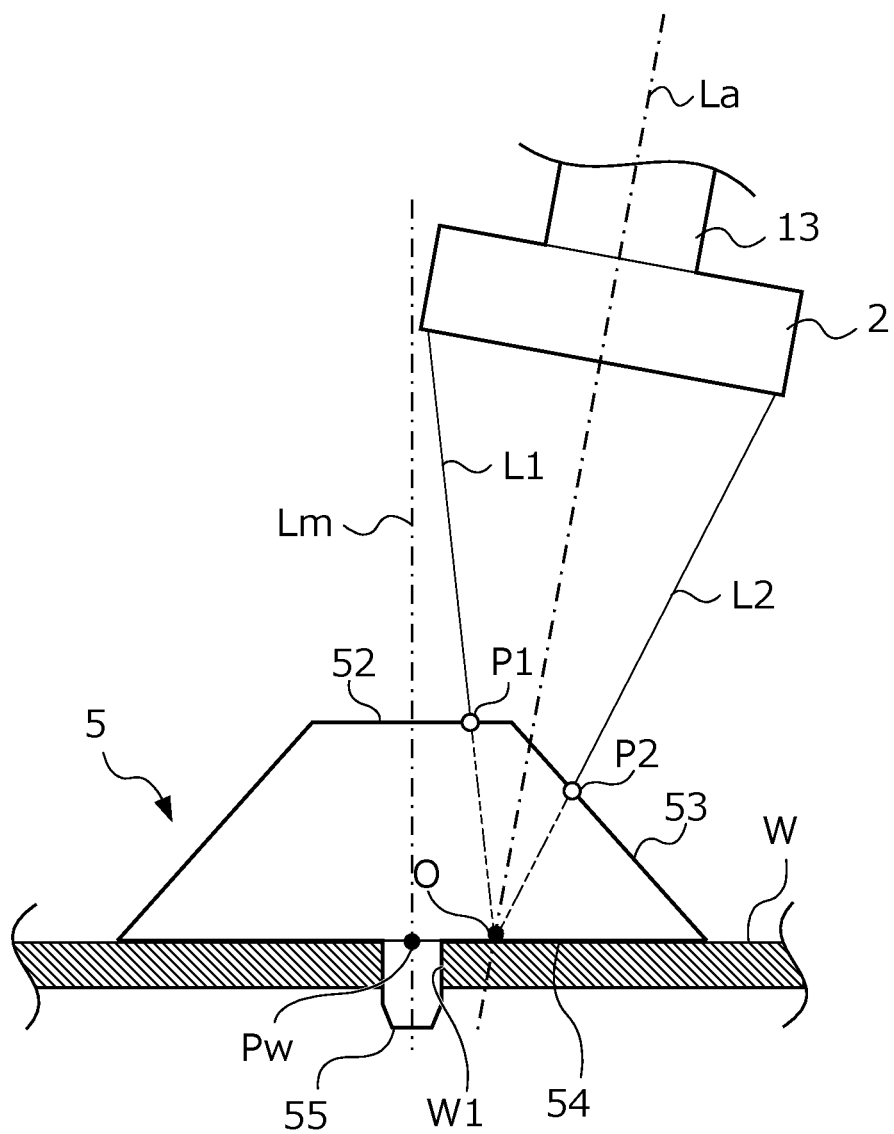
FIG. 7 is a view schematically illustrating a relative positional relationship between the arm distal end portion and the workpiece after a robot is controlled using a result of a provisional teaching step.

FIG. 7 is a view schematically illustrating the relative positional relationship between the arm distal end portion 13 and the workpiece W after execution of provisional teaching operation execution step S31, that is, after control of the work robot 1 using the result of provisional teaching step S1. Note that, in the following drawings, the shapes of the distance measuring instrument 2 and the marker 5 are simplified into two-dimensional shapes, as illustrated in FIG. 7, for facilitation of understanding. Further, with the simplification of the shape of the distance measuring instrument 2 into the two-dimensional shape, a description will be given on the assumption that two laser displacement gauges are provided across the axis La at an equal interval from the axis La in the distance measuring instrument 2. Further, in the following diagrams, the positions irradiated by the two laser displacement gauges are illustrated by outlined circles with signs P1 and P2. Further, the signs L1 and L2 are assigned to the optical axes extending from the light sources of the two laser displacement gauges, sections from the light sources to the irradiated positions are illustrated by thin solid lines, and sections from the irradiated positions to the vertex O are illustrated by thin two-dot chain lines. Since the position and posture of the work region point Pw of the workpiece W taught in provisional teaching step S1 are different from those of the actual workpiece W, the position and posture of the arm distal end portion 13 after execution of provisional teaching operation execution step S31 may deviate from the target position and posture due to variation in the robot and the workpiece, as illustrated in FIG. 7.

Next, in end surface search step S32, the control device 3 searches the end surface 52 of the mark 5 while moving the arm distal end portion 13. In the end surface search step, the control device 3 moves the arm distal end portion 13 in parallel in the X-Y plane so that all the measured values ZL1, ZL2, and ZL3 of the three laser displacement gauges become values close to one another, in other words, the axis La penetrates the end surface 52.

As illustrated in FIG. 7, after the arm distal end portion 13 is moved in the provisional teaching operation execution step using the result of the provisional teaching step, the axis La of the distance measuring instrument 2 may deviate from the marker axis Lm. In this case, as schematically illustrated in FIG. 7, the irradiated positions of the laser displacement gauges are separated into one included in the end surface 52, with the sign P1, and one included in the slope surface 53, with the sign P2, and the measured values may be substantially different.

Figure 8:
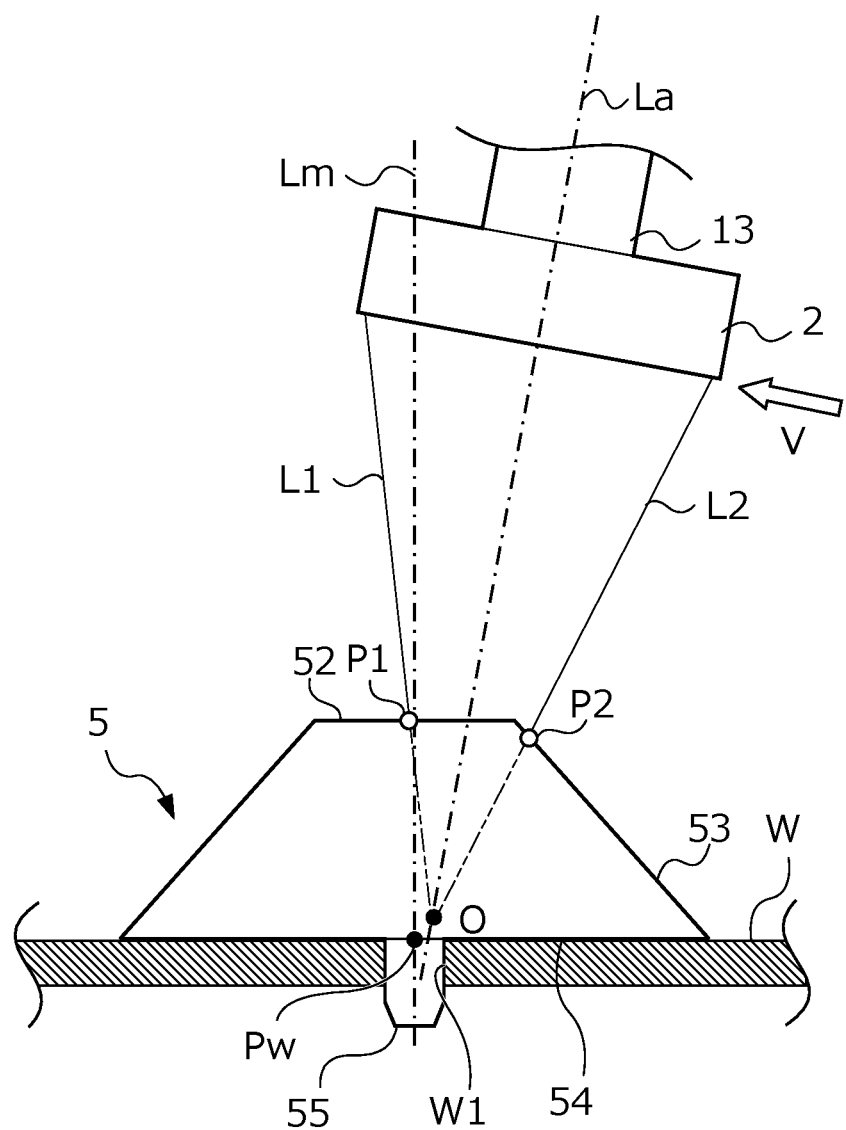
FIG. 8 is a diagram for describing a procedure of an end surface search step.

FIG. 8 is a view for describing the procedure of the end surface search step. In end surface search step S32, as illustrated in FIG. 8, the arm distal end portion 13 is moved in parallel along the predetermined azimuth vector V defined in the X-Y plane in the tool coordinate system to make all the measured values ZL1, ZL2, and ZL3 of the three laser displacement gauges be values close to one another (ZL1≈ZL2≈ZL3). Note that the azimuth vector that makes all the three measured values ZL1, ZL2, and ZL3 be values close to one another can be calculated by weighting the azimuth vectors L1V, L2V, and L3V of the three laser displacement gauges with the respective measured values ZL1, ZL2, and ZL3, and summing the weighted vectors. The movement of the arm distal end portion in the X-Y plane using the azimuth vector corresponds to, intuitively, parallel movement toward a relatively small measured value of the three laser displacement gauges. Whether all the measured values ZL1 to ZL3 of the three laser displacement gauges become values close to one another may be determined, for example, according to whether all of the absolute values of the difference among the measured values (|ZL1−ZL2|, |ZL2−ZL3|, and |ZL3−ZL1|) are equal to or less than a threshold, which is determined to be a small value near 0, may be determined according to whether the sum of squares of the difference is equal to or less than a predetermined threshold, or may be determined using a known method.

Further, in the end surface search step, in addition to the parallel movement along the X-Y plane in the tool coordinate system, parallel movement along the Z axis in the tool coordinate system so that the average value of the three measured values ZL1 to ZL3 becomes close to a predetermined positive threshold a (that is, (ZL1+ZL2+ZL3)/3≈a) may be combined. With the step, the interval between the marker 5 and the arm distal end portion 13 can approximate to the interval determined by the threshold a.

Note that, in end surface search step S32, the arm distal end portion 13 may be moved while keeping the distance between the arm distal end portion 13 and the marker 5 such that the diameter of a virtual circle (not illustrated) passing through three irradiated points becomes larger than the diameter of the end surface 52. In this case, after completion of end surface search step S32, the axis La penetrates the end surface 52 and all the three irradiated positions are included in the slope surface 53. Therefore, in separation step S33 to be performed afterward, all the three irradiated positions can be easily arranged near to the center of the end surface 52.

Figure 9:
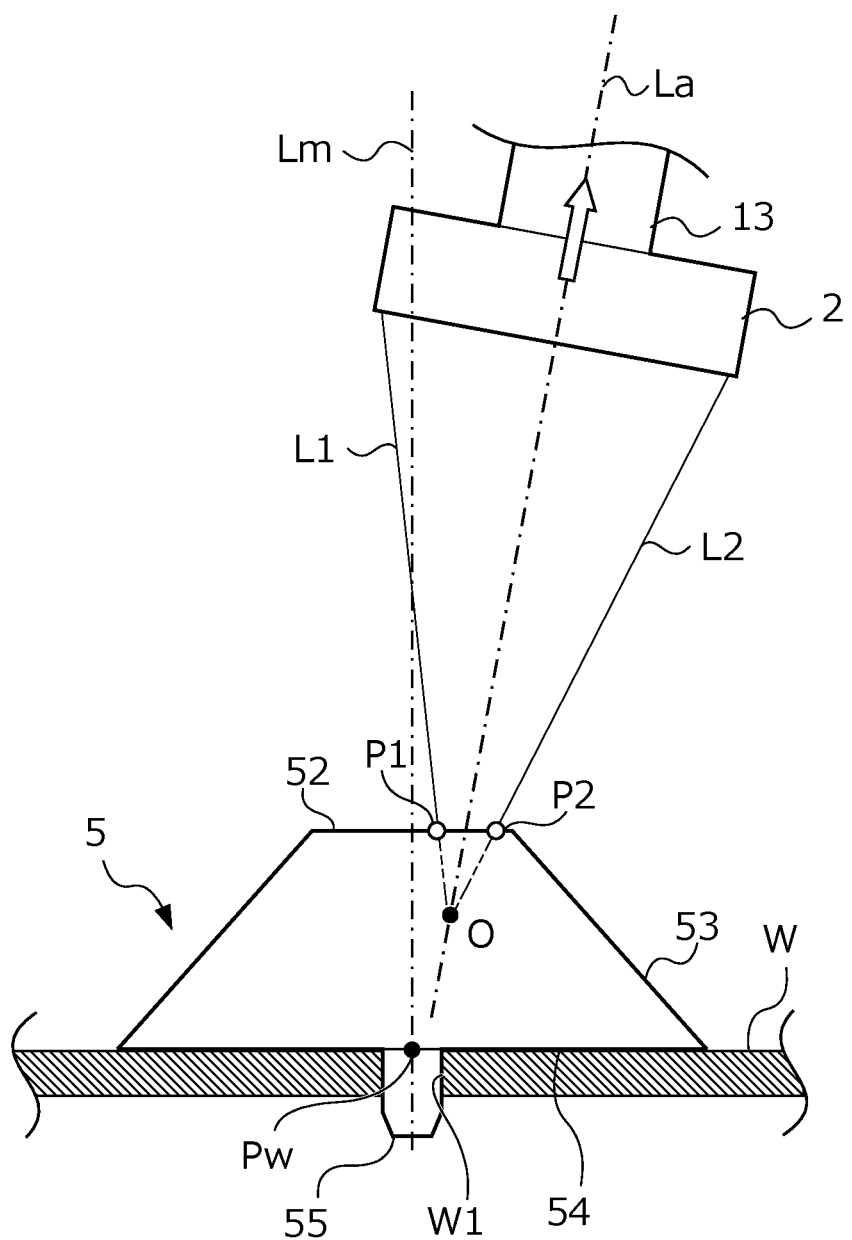
FIG. 9 is a diagram for describing a procedure of a separation step.

Next, in separation step S33, the control device 3 separates the arm distal end portion 13 from the marker 5 by a predetermined separation distance along the Z axis (that is, the axis La) in the tool coordinate system so that the irradiated positions of all the three laser displacement gauges are arranged within the end surface 52 of the marker 5 (see FIG. 9). Note that the separation distance may be a predetermined fixed amount, or may be determined by an arithmetic operation using the measured values of the laser displacement gauges each time.

Hereinafter, the case of determining the separation distance by an arithmetic operation will be described. First, when the arm distal end portion 13 is moved along the Z axis, the measured values of the three laser displacement gauges become large and the irradiated positions come close to each other, as illustrated by the signs P1 and P2 in FIG. 9. At this time, when the arm distal end portion 13 is separated along the Z axis in the state where all the irradiated positions of the three laser displacement gauges are included in the end surface 52 of the marker 5, the triangle having the three irradiated positions as vertexes becomes small while maintaining the similar figure. In other words, in a case where the triangle having the three irradiated positions as vertexes is changed while maintaining the similar figure when the arm distal end portion 13 is separated along the Z axis, all the three irradiated positions can be determined to be arranged within the end surface 52. Therefore, in this separation step, the lengths of the three sides of the triangle having the irradiated positions of the three laser displacement gauges as vertexes may be calculated using the measured values of the laser displacement gauges while separating the arm distal end portion 13 along the Z axis, and the movement of the arm distal end portion 13 may be stopped in response to confirmation of the fact that the shape of the triangle calculated by the arithmetic operation is changed while maintaining the similar figure.

Note that the step of separating the arm distal end portion 13 along the Z axis may be performed immediately after provisional teaching operation execution step S31. In this case, if a figure similar to that described above is maintained, end surface search step S32 and separation step S33 may be omitted. That is, in the initial movement step in FIG. 6, the arm distal end portion 13 is not necessarily moved according to the procedure illustrated in FIG. 6 as long as all the irradiated positions of the three laser displacement gauges are arranged within the end surface 52 of the marker 5 in the end.

As described above, the arm distal end portion 13 can be moved to arrange all the irradiated positions of the three laser displacement gauges within the end surface 52 of the marker 5 through provisional teaching operation execution step S31, end surface search step S32, and separation step S33 in FIG. 6.

Figure 10A:
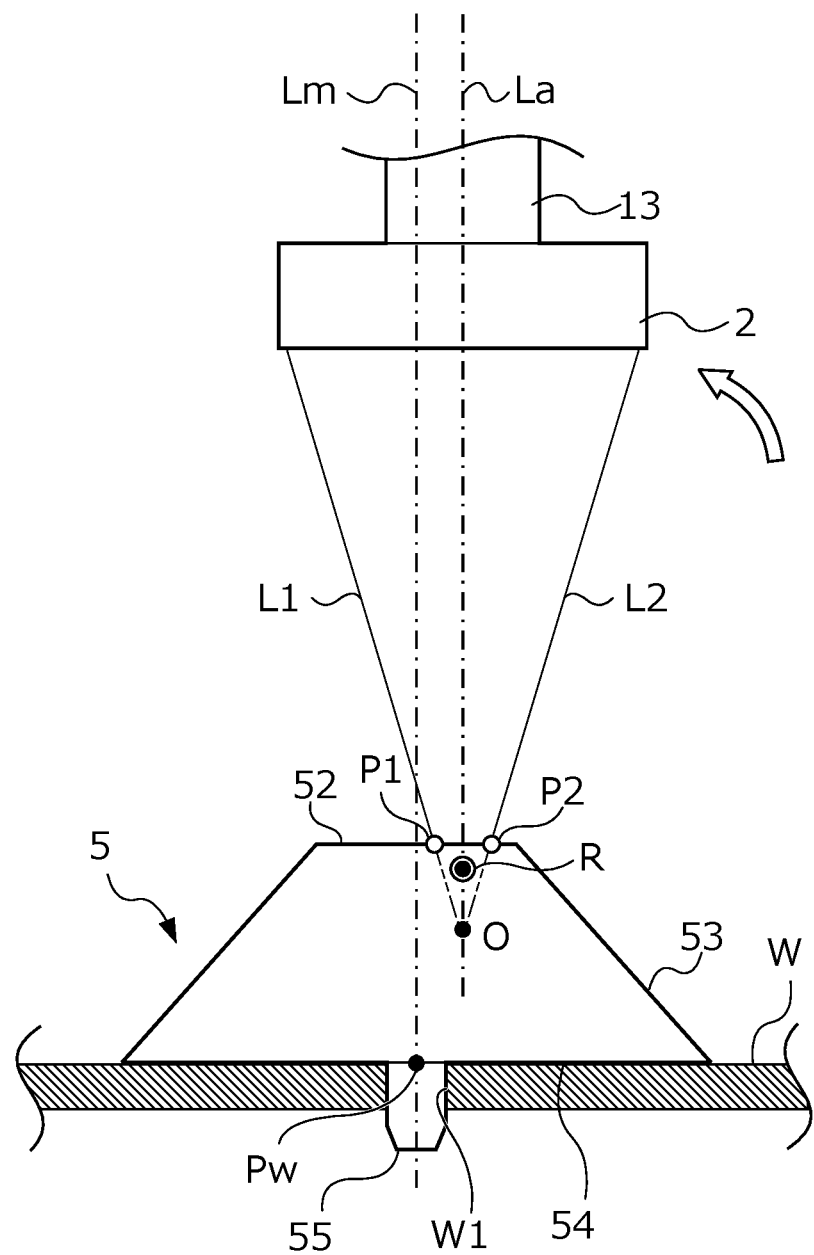
FIG. 10A is a diagram for describing a procedure of a posture modification step.

Next, in posture modification step S4, the control device 3 moves the arm distal end portion such that the measured values of the three laser displacement gauges become close to each other, in other words, the axis La of the arm distal end portion 13 and the marker axis Lm become parallel, while maintaining the state where all the irradiated positions of the three laser displacement gauges are arranged within the end surface 52 of the marker 5 (see FIG. 10A).

Figure 10B:
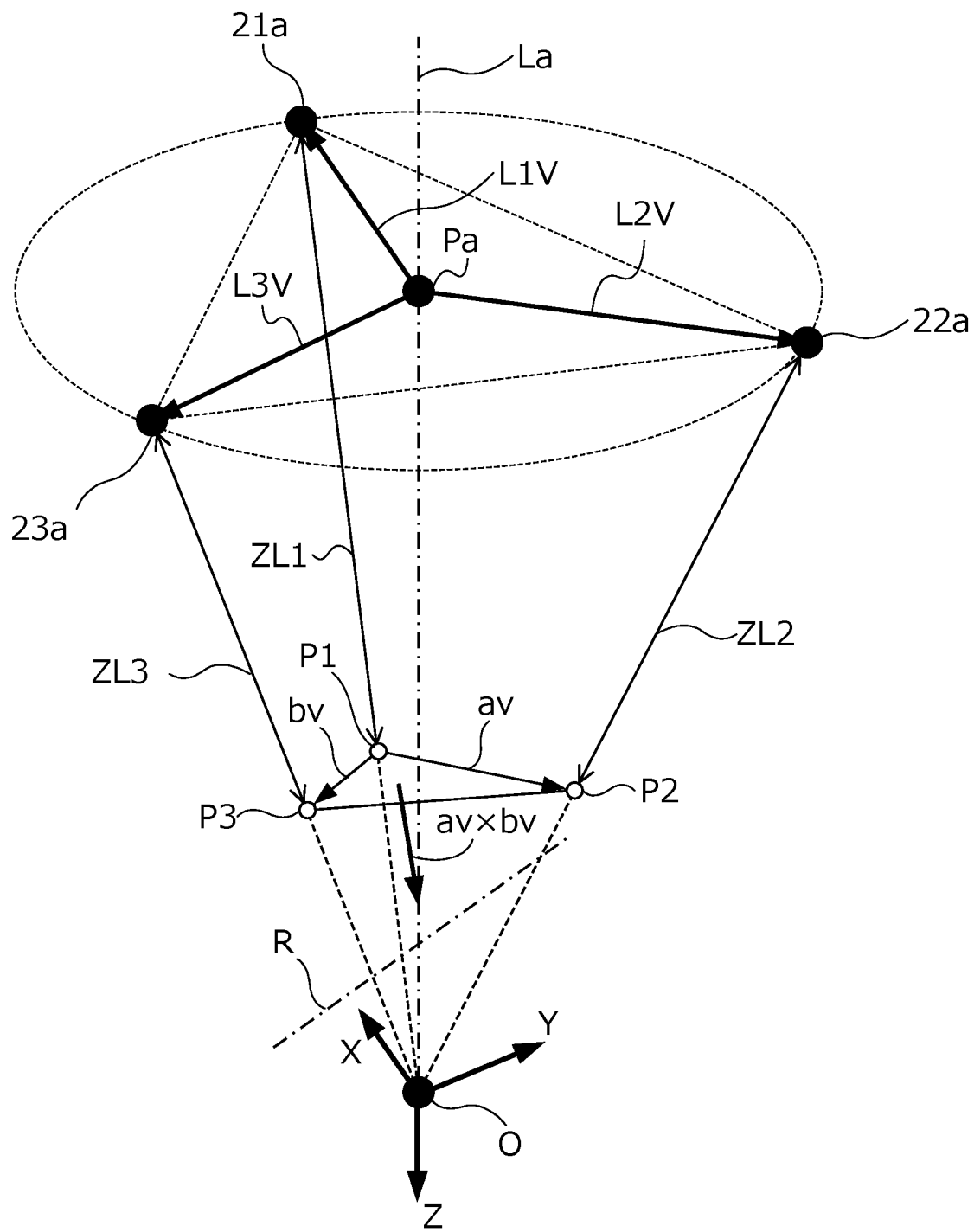
FIG. 10B is a diagram for describing a procedure of the posture modification step.

Here, the movement of the arm distal end portion 13 to make the axis La of the arm distal end portion 13 and the marker axis Lm parallel is derived by the following procedure, for example. First, as illustrated in FIG. 10B, the vectors av and bv of the triangle having the three irradiated positions as vertexes and the outer product vector (av×bv) of the two vectors are calculated using the measured values ZL1, ZL2, and ZL3 of the three laser displacement gauges (that is, the distances from the light sources 21a, 22a, and 23a to the irradiated positions indicated by the signs P1, P2, and P3). This outer product vector (av×bv) is parallel to the marker axis Lm. Therefore, to make the axis La of the distance measuring instrument 2 and the marker axis Lm parallel, the rotation center axis R perpendicular to both the outer product vector (av×bv) and the z axis (that is, the outer product vector of the outer product vector (av×bv) and the z axis) is set to a tetrahedron formed of the three irradiated positions indicated by the signs P1, P2, and P3 and the vertex O or to its vicinity, and the arm distal end portion 13 may be rotated around the rotation center axis R until the three measured values ZL1 to ZL3 become values close to one another.

Figure 11:
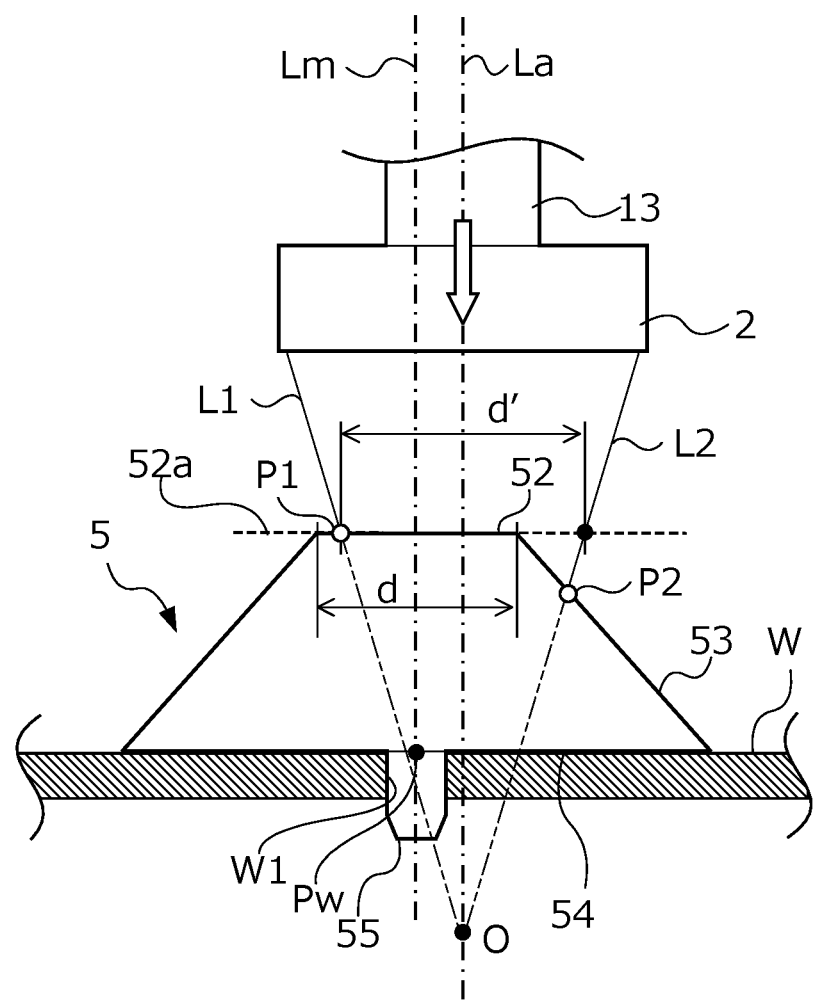
FIG. 11 is a diagram for describing a procedure of an approach step.

Next, in approach step S5, as illustrated in FIG. 11, the control device 3 brings the arm distal end portion 13 close to the marker 5 along the Z axis by a predetermined approach distance so that a diameter d' of the circle passing through the irradiated positions of the three laser displacement gauges in the virtual plane 52a including the end surface 52 becomes larger than a diameter d of the end surface 52.

Note that the approach distance in approach step S5 may be a predetermined fixed amount or may be determined by performing an arithmetic operation using the measured values of the laser displacement gauges each time. In the case of determining the approach distance by an arithmetic operation, at the point of time when posture modification step S4 is completed, the axis La of the distance measuring instrument 2 is perpendicular to the end surface 52, and all the three irradiated positions are located within the end surface 52. Therefore, the control device 3 can calculate the distance between the center point Pa and the end surface 52, and can calculate how close the arm distal end portion 13 has to be brought along the axis La, so that the diameter d' of the circle on the virtual plane 52a becomes larger than the diameter d.

Figure 12:
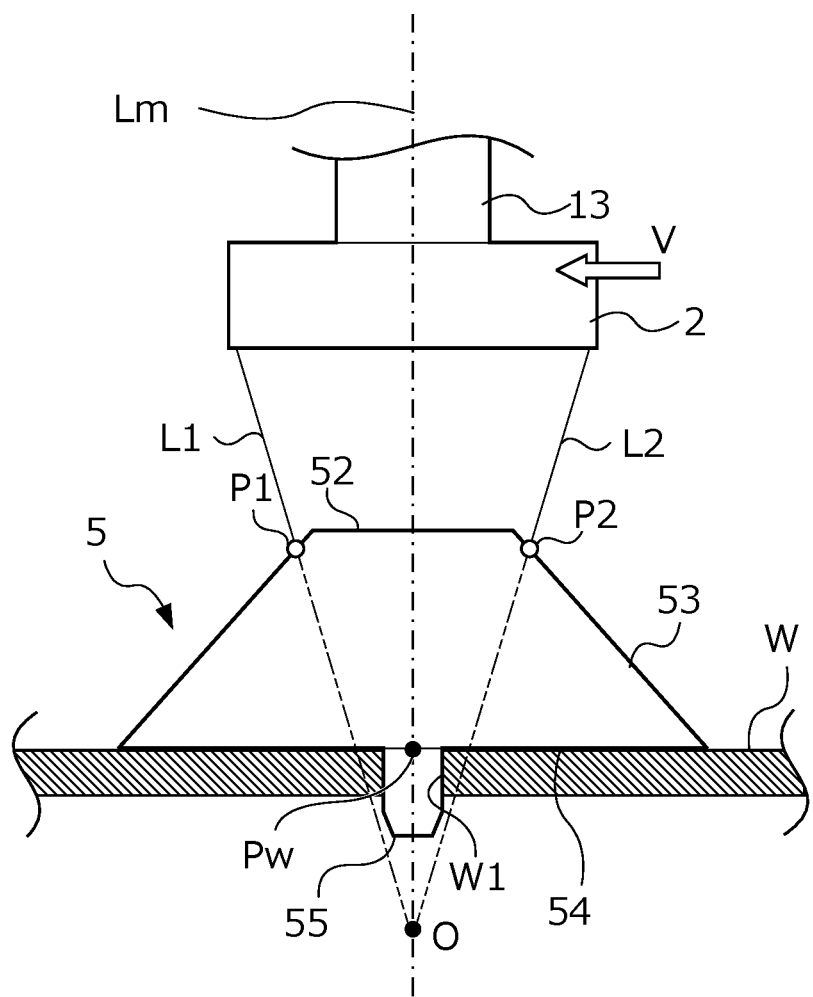
FIG. 12 is a diagram for describing a procedure of an alignment step.

Next, in alignment step S6, as illustrated in FIG. 12, the control device 3 executes the alignment step for causing the axis La of the arm distal end portion 13 and the marker axis Lm to coincide with each other by moving the arm distal end portion 13 in parallel along the X-Y plane in the tool coordinate system so that the measured values of the three laser displacement gauges become close to each other. Further, the azimuth vector V along the X-Y plane of the arm distal end portion 13 in alignment step S6 can be calculated by the sum of the weighted azimuth vectors L1V to L3V of the three laser displacement gauges with the measured values ZL1 to ZL3, similarly to end surface search step S32.

Note that, as described above, the marker axis Lm is coaxial with the normal line Lw of the workpiece W. Therefore, through alignment step S6, the axis La of the distance measuring instrument 2 and the normal line Lw of the work W can be made coaxial, that is, the posture of the arm distal end portion 13 can be set to the target posture described with reference to FIG. 3.

Figure 13:
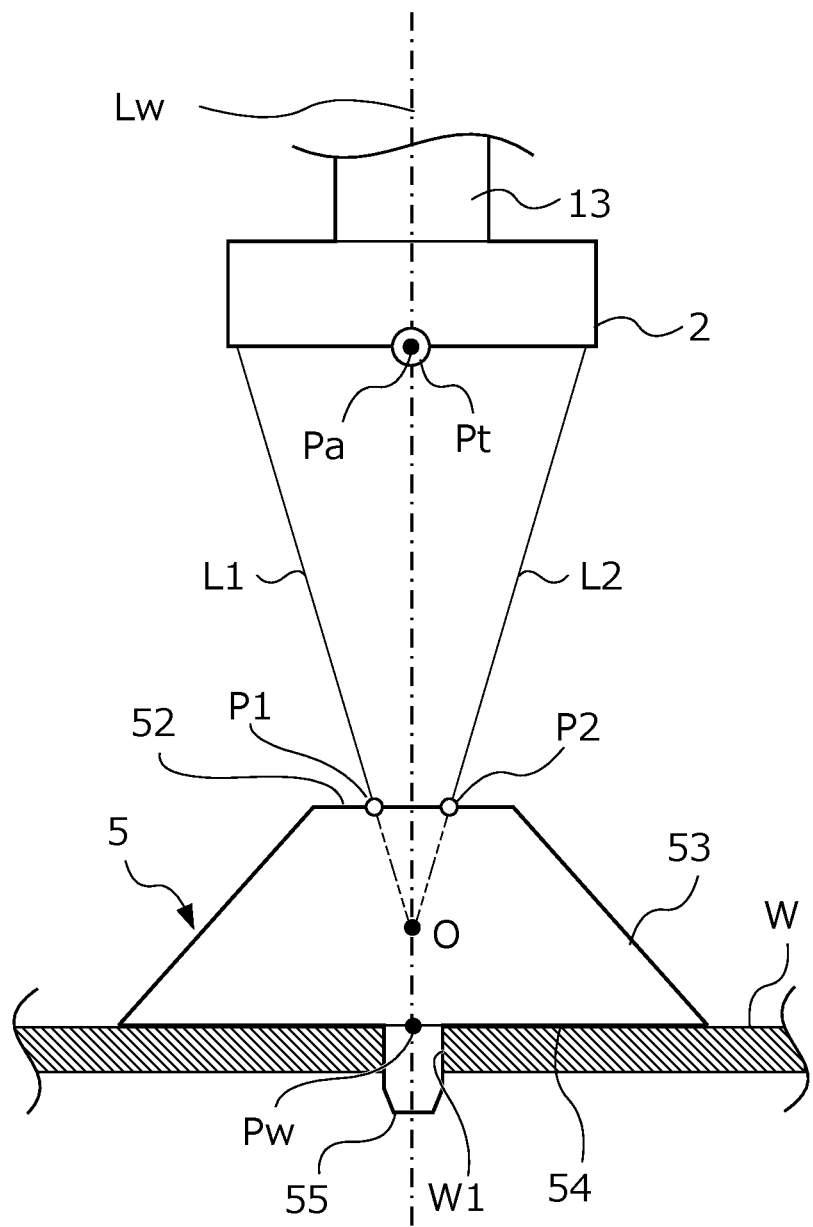
FIG. 13 is a diagram for describing a procedure of a positioning step.

Next, in positioning step S7, as illustrated in FIG. 13, the control device 3 adjusts the position of the arm distal end portion 13 by bringing the arm distal end portion 13 close or separating the arm distal end portion 13 along the Z axis. As described with reference to FIG. 3, the target position Pt of the center point Pa of the distance measuring instrument 2 is set to the position separated from the work region point Pw of the workpiece W by the predetermined work distance along the normal line Lw. Here, the distance from the center point Pa of the distance measuring instrument 2 to the end surface 52 of the marker 5 can be calculated using the measured values ZL1 to ZL3 of the three laser displacement gauges. Further, since the thickness of the marker 5 is known, the distance from the work region point Pw to the end surface 52 of the marker 5 is known. Therefore, in positioning step S7, the control device 3 can cause the center point Pa of the distance measuring instrument 2 and the target position Pt indicated by the outlined circle in FIG. 13 to coincide with each other by bringing the arm distal end portion 13 close or separating the arm distal end portion 13 along the z axis until the distance of the sum of the distance between the center point Pa of the distance measuring instrument 2 and the end surface 52 of the marker 5 calculated using the measured values of the laser displacement gauges and the distance from the known work region point Pw to the end surface 52 of the marker 5 becomes the target work distance. As described above, according to the position and posture adjustment method in FIG. 4, the arm distal end portion 13 can be set to the target position and to the target posture.

According to the position and posture adjustment method of the present embodiment, the following effects are exhibited.

(1) In the present position and posture adjustment method, in initial movement step S3, the arm distal end portion 13 is moved to arrange the irradiated positions of the three laser displacement gauges within the end surface 52 of the marker 5 by using the result of provisional teaching step S1. Next, in posture modification step S4, the arm distal end portion 13 is moved to make the measured values of the three laser displacement gauges close to each other while maintaining the state where the three irradiated positions are arranged within the end surface 52 of the marker 5. Next, in approach step S5, the arm distal end portion 13 is brought close to the marker 5 along the Z axis until the diameter d' of the virtual circle passing through the irradiated positions of the laser displacement gauges becomes larger than the diameter d of the end surface 52. Next, in alignment step S6, the arm distal end portion 13 is moved parallel along the X-Y plane to make the measured values of the three laser displacement gauges close to each other, thereby to cause the axis La of the arm distal end portion 13 and the marker axis Lm to coincide with each other. Next, in positioning step S7, the arm distal end portion 13 is moved along the Z axis to adjust the position of the arm distal end portion 13. From the above steps, according to the position and posture adjustment method in FIG. 4, the position and posture of the arm distal end portion 13 can be adjusted to the target position and posture described with reference to FIG. 3.

Note that, in the present position and posture adjustment method, by using the three laser displacement gauges 21 to 23 capable of measuring the distance from the light sources to the irradiated positions as the distance measuring instrument 2, and using the marker having the head cut conical shape as the marker 5, the irradiated positions of the laser displacement gauges 21 to 23 can be calculated by a simple arithmetic operation using the measured values of the laser displacement gauges 21 to 23. Therefore, in executing steps S3 to S7, the operator does not need to visually confirm the irradiated positions of the laser light. Therefore, in the position and posture adjustment method in FIG. 4, nearly all the steps can be automated. As a result, according to the position and posture adjustment method in FIG. 4, the position and posture of the arm distal end portion 13 with respect to the workpiece W can be promptly adjusted while making the variation due to the operator small.

(2) As described above, in initial movement step S3, the arm distal end portion 13 is moved to arrange all the irradiated positions of the three laser displacement gauges 21 to 23 within the end surface 52 of the marker 5. At this time, in the case where the position and posture of the work region point Pw of the workpiece W taught in provisional teaching step S1 are appropriate, all the irradiated positions of the three laser displacement gauges 21 to 23 are arranged within the end surface 52 when the arm distal end portion 13 is moved using the result of provisional teaching step S1. However, in the case where the position and posture of the work region point Pw of the workpiece W taught in provisional teaching step S1 are inappropriate, the arm distal end portion 13 needs to be moved further after being moved using the result of provisional teaching step S1. In consideration of such a case, in the initial movement step in FIG. 6, end surface search step S32 and separation step S33 are performed after provisional teaching operation execution step S31. In end surface search step S32, the arm distal end portion 13 is moved to make all the measured values of the three laser displacement gauges 21 to 23 be values close to one another. With the step, the arm distal end portion 13 can be moved to a vicinity of the end surface 52 of the marker 5. In other words, the arm distal end portion 13 is moved parallel in the X-Y plane to cause the axis La to penetrate the end surface 52. After that, in separation step S33, the arm distal end portion 13 is separated from the marker 5 along the Z axis to arrange all the irradiated positions of the three laser displacement gauge 21 to 23 within the end surface 52. When the arm distal end portion 13 is separated from the marker 5 along the Z axis in this manner, the triangle formed of the three irradiated positions becomes small. Therefore, all the three irradiated positions can be arranged within the end surface 52 under a simple control rule.

An embodiment of the present invention has been described. However, the present invention is not limited to the embodiment.

Note that, in the above-described embodiment, the example of performing provisional teaching step S1 using computer simulation has been described. However, the present invention is not limited to this case. In provisional teaching step S1, the position and the posture of the work region point Pw may be taught to the robot by programming using a real device. Specifically, for example, fine adjustment may be required on site due to individual facility differences, installation errors, or the like when applying the present invention after facility relocation or using it with another facility having the same specification.

What is claimed is:

1. A position and posture adjustment method for adjusting a position and a posture of an arm distal end portion of a robot with respect to a workpiece, using a measuring device attached to the arm distal end portion and a marker having a head cut conical shape arranged in the workpiece, the measuring device including three laser displacement gauges each arranged at vertexes of an equilateral triangle and having optical axes each set to intersect at a vertex of a trigonal pyramid having the equilateral triangle as a base, the position and posture adjustment method comprising:

a provisional teaching step of teaching the robot a predetermined position and a predetermined posture of the workpiece;

a marker installation step of installing the marker at the predetermined position of the workpiece with the predetermined posture;

an initial movement step of moving the arm distal end portion such that irradiated positions of the three laser displacement gauges are arranged within an end surface of the marker, using a result of the provisional teaching step;

a posture modification step of moving the arm distal end portion such that measured values of the three laser displacement gauges become close to each other while maintaining a state in which the irradiated positions of the three laser displacement gauges are arranged within the end surface;

an approach step of bringing the arm distal end portion close to the marker along an axis of the trigonal pyramid such that a diameter of a virtual circle passing through the irradiated positions of the three laser displacement gauges in a virtual plane including the end surface becomes larger than a diameter of the end surface;

an alignment step of causing the axis of the trigonal pyramid and an axis of the marker to coincide with each other by moving the arm distal end portion parallel along a plane perpendicular to the axis of the trigonal pyramid such that the measured values of the three laser displacement gauges become close to each other; and a positioning step of adjusting the position of the arm distal end portion by moving the arm distal end portion along the axis of the trigonal pyramid.

2. The position and posture adjustment method according to claim 1, wherein the initial movement step includes a provisional teaching operation execution step of setting the arm distal end portion to a predetermined position and posture, using the result of the provisional teaching step, an end surface search step of moving the arm distal end portion such that all the measured values of the three laser displacement gauges become values close to one another, and a separation step of separating the arm distal end portion from the marker along the axis of the trigonal pyramid such that the irradiated positions of the three laser displacement gauges are arranged within the end surface.

* * * * *